(12) United States Patent
Dittmar et al.

(10) Patent No.: US 11,668,348 B2
(45) Date of Patent: Jun. 6, 2023

(54) SECONDARY SEALING DEVICE FOR WHEEL BEARING ASSEMBLIES

(71) Applicant: AKTIEBOLAGET SKF, Gothenburg (SE)

(72) Inventors: Rico Dittmar, Schweinfurt (DE); Johannes Klaus Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/314,214

(22) Filed: May 7, 2021

(65) Prior Publication Data
US 2022/0355615 A1   Nov. 10, 2022

(51) Int. Cl.
*F16C 33/78* (2006.01)
*B60B 27/00* (2006.01)
*F16C 33/80* (2006.01)

(52) U.S. Cl.
CPC ...... *F16C 33/7896* (2013.01); *B60B 27/0073* (2013.01); *F16C 33/783* (2013.01); *F16C 33/7816* (2013.01); *F16C 33/7889* (2013.01); *F16C 33/805* (2013.01); *F16C 2326/02* (2013.01)

(58) Field of Classification Search
CPC ............ F16C 33/7813; F16C 33/7816; F16C 33/783; F16C 33/7886; F16C 33/7889; F16C 33/7896; F16C 33/80; F16C 33/805; F16C 2326/02; B60B 27/0073
See application file for complete search history.

(56) References Cited

U.S. PATENT DOCUMENTS 2,908,536 A * 10/1959 Dickey ............... F16C 33/7889
                                                      16/36
5,651,617 A * 7/1997 Danielsson ........... B60B 27/001
                                                      384/585
(Continued)

FOREIGN PATENT DOCUMENTS

JP   H02121625 U  * 10/1990
JP   2007127157 A  *  5/2007
(Continued)

OTHER PUBLICATIONS

Machine Translation of JP-2013160280-A (Year: 2013).*

*Primary Examiner* — Alan B Waits
(74) *Attorney, Agent, or Firm* — J-TEK Law PLLC; Scott T. Wakeman; Mark A. Ussai

(57) ABSTRACT

A secondary sealing device is for a wheel bearing assembly including a fixed inner axle with an outer circumferential surface and a bearing inner race, an outer hub rotatable about the inner axle and having an inner circumferential surface and a bearing outer race, rolling elements disposed between the inner and outer races, and a primary seal(s) connected with the inner axle and sealingly engaged with the outer hub. The secondary sealing device includes a rigid annular body having an inner radial end coupled with the inner axle and an outer radial end spaced radially inwardly from the inner circumferential surface of the outer hub so as to define an annular gap between the body and the outer ring. The body is located between the primary seal and an axial end of the hub so as to provide a barrier configured to prevent contaminants from contacting the primary seal.

11 Claims, 19 Drawing Sheets

(56) References Cited

U.S. PATENT DOCUMENTS

| | | | | |
|---|---|---|---|---|
| 6,082,905 | A | * | 7/2000 | Vignotto ............... F16C 33/768 384/486 |
| 6,979,131 | B1 | * | 12/2005 | Lippert .................. F16C 19/28 384/570 |
| 8,246,253 | B2 | * | 8/2012 | Masui .................. F16J 15/3456 384/477 |
| 2009/0220182 | A1 | * | 9/2009 | Furukawa ............. F16C 19/386 384/543 |
| 2017/0284470 | A1 | * | 10/2017 | Wollert ................ F16J 15/3264 |
| 2017/0284471 | A1 | * | 10/2017 | Shibayama ......... F16C 33/7883 |

FOREIGN PATENT DOCUMENTS

| | | | | |
|---|---|---|---|---|
| JP | 2008240948 | A | * 10/2008 | ............ F16C 33/783 |
| JP | 2013160280 | A | * 8/2013 | ............ F16C 33/7889 |
| JP | 2015222096 | A | * 12/2015 | ............ F16C 13/006 |
| WO | WO-9960282 | A1 | * 11/1999 | .......... F16C 33/6618 |

\* cited by examiner

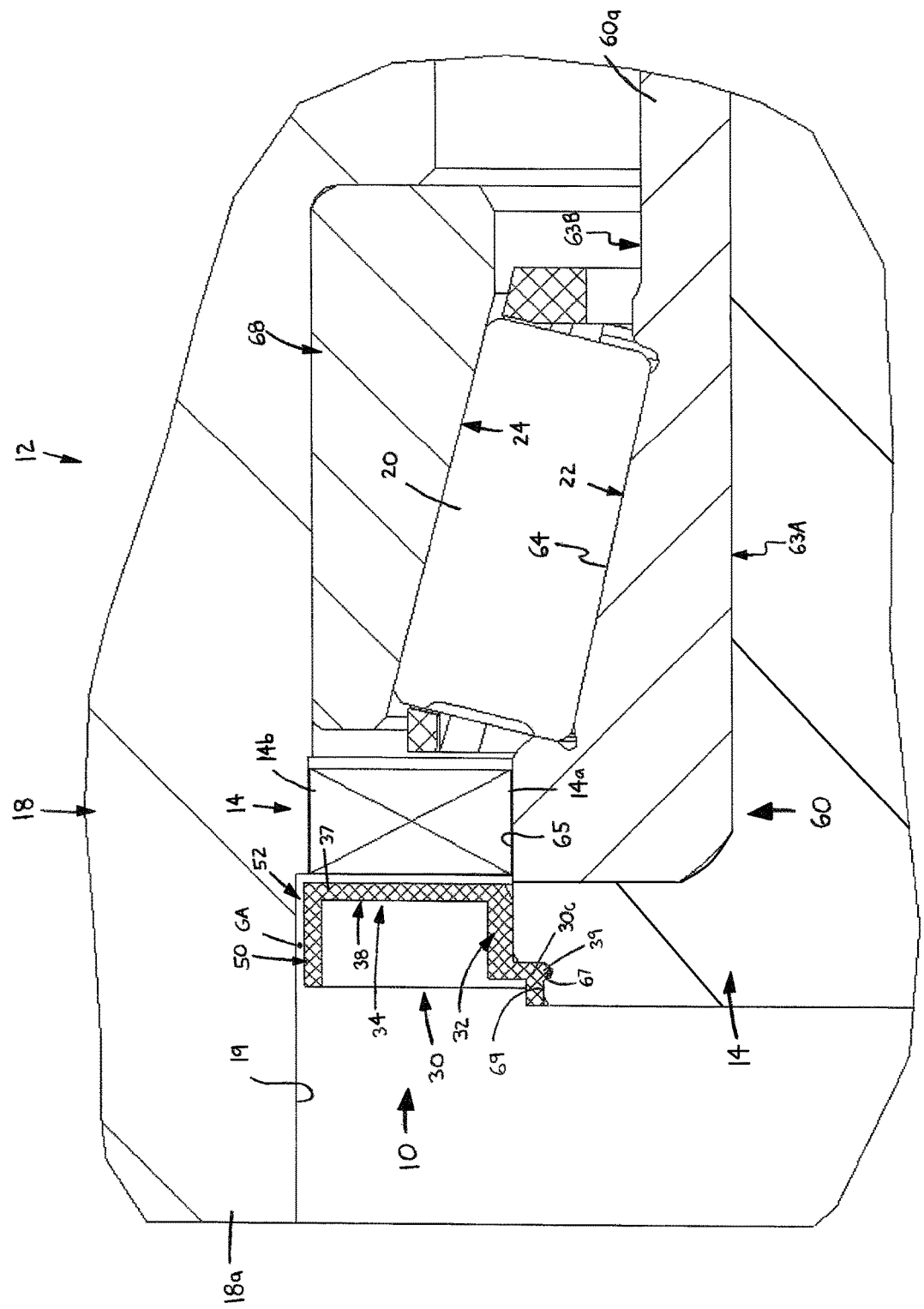

US 11,668,348 B2

SECONDARY SEALING DEVICE FOR WHEEL BEARING ASSEMBLIES

BACKGROUND OF THE INVENTION

The present invention relates to bearings, and more particularly to wheel bearing assemblies.

Wheel bearing assemblies, particularly for mounting wheels to vehicles such as trucks, typically include an outer hub connectable to the wheel and an inner axle connected with a vehicle frame. The bearings are often double-row tapered rollers disposed between the outer hub and the inner axle and enable the hub, and thereby the wheel, to rotate about a central axis extending through the fixed axle. As such bearings are generally exposed to contaminants such as dust, mud, oil, metal shavings, etc., which may damage the bearings if contacting the rolling elements or the bearing raceway surfaces, one or more seals are provided adjacent to the raceways to exclude such contaminants. When operating in particularly extreme environments, these seals may become damaged through repeated contact or exposure to such contaminants, necessitating replacement of the seals.

SUMMARY OF THE INVENTION

In one aspect, the present invention is a wheel bearing assembly comprising a fixed inner axle having an outer circumferential surface and at least one bearing inner race. An outer hub is rotatably disposed about the inner axle and has an outboard axial end, an inboard axial end, an inner circumferential surface spaced radially outwardly from the outer circumferential surface of the inner axle so as to define an interior space, and at least one bearing outer race disposed about the at least one inner race. A plurality of rolling elements is disposed between the at least one inner race and the at least one outer race and at least one primary seal has an inner radial end connected with the inner axle adjacent to the at least one inner race and an outer radial end sealingly engaged with the outer hub adjacent to the at least one outer race. Further, a secondary seal includes a rigid annular body having an inner radial end coupled with the inner axle and an outer radial end spaced radially inwardly from the inner circumferential surface of the outer hub so as to define an annular gap between the annular body and the outer hub. The annular body is located between the primary seal and a proximal one of the outboard axial end and the inboard axial end of the outer hub so as to provide a barrier configured to prevent contaminants passing into the interior space from contacting the primary seal.

In another aspect, the present invention is a secondary sealing device for a wheel bearing assembly, the wheel bearing assembly including a fixed inner axle with an outer circumferential surface and a bearing inner race and an outer hub rotatably disposed about the inner axle and having outboard and inboard axial ends, an inner circumferential surface spaced radially outwardly from the outer circumferential surface of the inner axle so as to define an interior space, and at least one bearing outer race disposed about the at least one inner race. A plurality of rolling elements is disposed between the inner race and the outer race and at least one primary seal is connected with the inner axle and sealingly engaged with the outer hub. The secondary sealing device comprises a rigid annular body having an inner radial end coupled with the inner axle and an outer radial end spaced radially inwardly from the inner circumferential surface of the outer hub so as to define an annular gap between the body and the outer ring. The annular body is located between the primary seal and a proximal one of the outboard axial end and the inboard axial end of the outer hub so as to provide a barrier configured to prevent contaminants passing into the interior space from contacting the primary seal.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 19 is another view of the outboard portion of FIG 7, showing a variation of the second embodiment seal with an inwardly-stepped mounting section engaged with the axle.

DETAILED DESCRIPTION OF THE INVENTION

Figure 1:
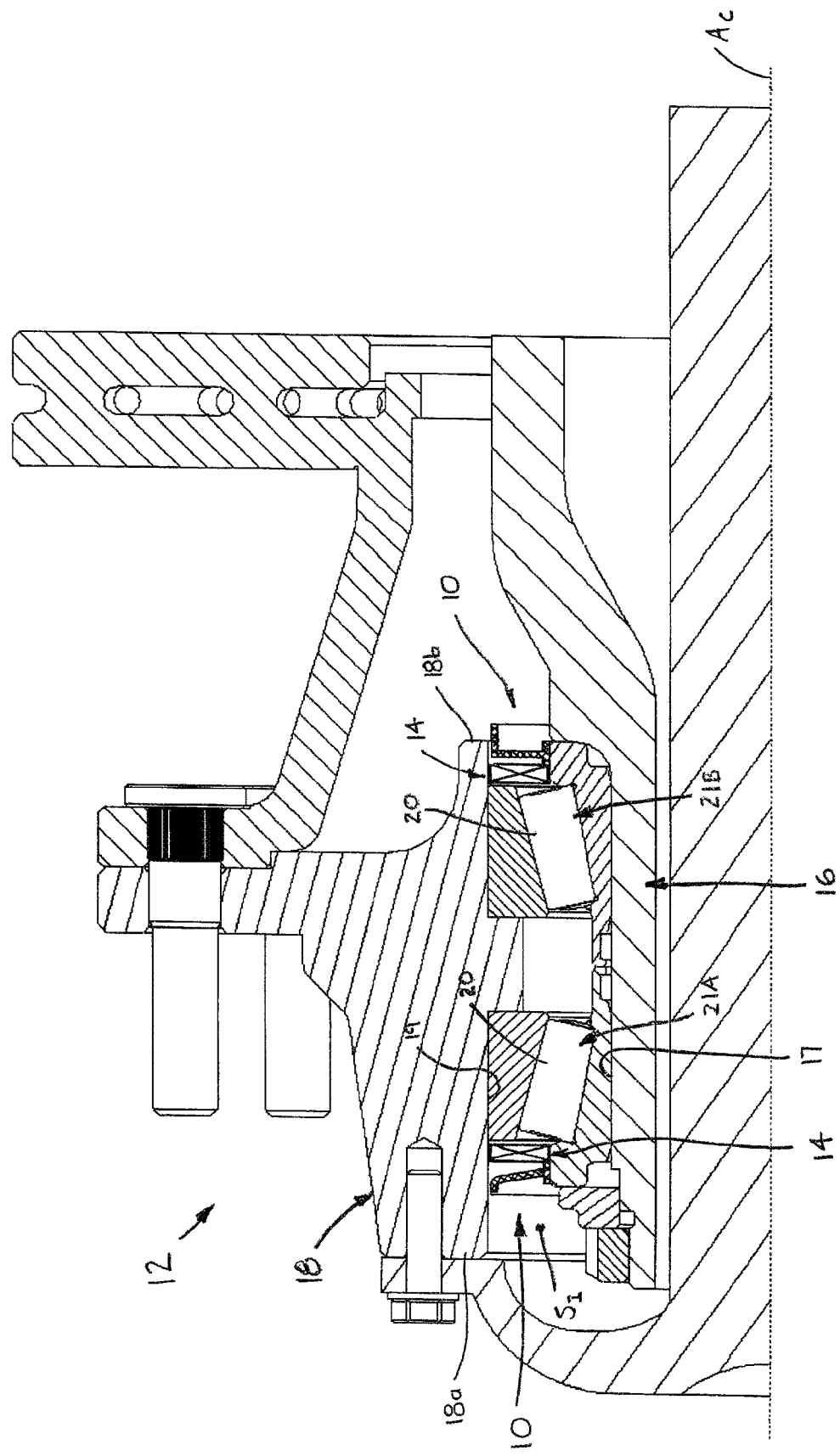
FIG. 1 is an axial cross-sectional view of an upper portion of a wheel bearing assembly having two sealing devices in accordance with the present invention, shown with a hollow inner axle disposed about a rotatable central shaft.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-18 a secondary seal or "shield" 10 of a wheel bearing assembly 12 for preventing contaminants from contacting or passing to a primary seal 14, which seals between an inner axle 16 and an outer hub 18 rotatable about a central axis Ac extending through the axle 16, and is located adjacent to a row 21 of rolling elements 20. More specifically, the wheel bearing assembly 12 comprises the fixed inner axle 16 having an outer circumferential surface 17 and at least one bearing inner race 22 and the outer hub 18 is rotatably disposed about the inner axle 16 and has outboard and inboard axial ends 18a, 18b, respectively, an inner circumferential surface 19, and at least one outer race 24. The outer circumferential surface 19 of the outer hub 18 is spaced radially outwardly from the outer circumferential surface 17 of the inner axle 16 so as to define an annular interior space $S_I$ and the at least one bearing outer race 24 is disposed about the at least one inner race 22. A plurality of the rolling elements 20 is disposed between the at least one inner race 22 and the at least one outer race 24 to form the row 21 of rolling elements 20. Preferably, the rolling elements 20 are tapered rollers as shown in the drawing figures, but may alternatively be formed as balls, cylindrical rollers, spherical rollers, needles or any other known type of rolling element.

Further, the at least one primary seal 14 has an inner radial end 14a connected with the inner axle 16 adjacent to the at least one inner race 22 and an outer radial end 14b sealingly engaged with the outer hub 18 adjacent to the at least one outer race 24. As such, the primary seal 14, which may be a cassette type of seal, a radial lip or "oil" seal, or any other appropriate bearing seal, functions to both prevent contaminants from contacting or reaching the rolling elements 20 and to retain lubricant disposed about the rolling elements 20.

Figure 4:
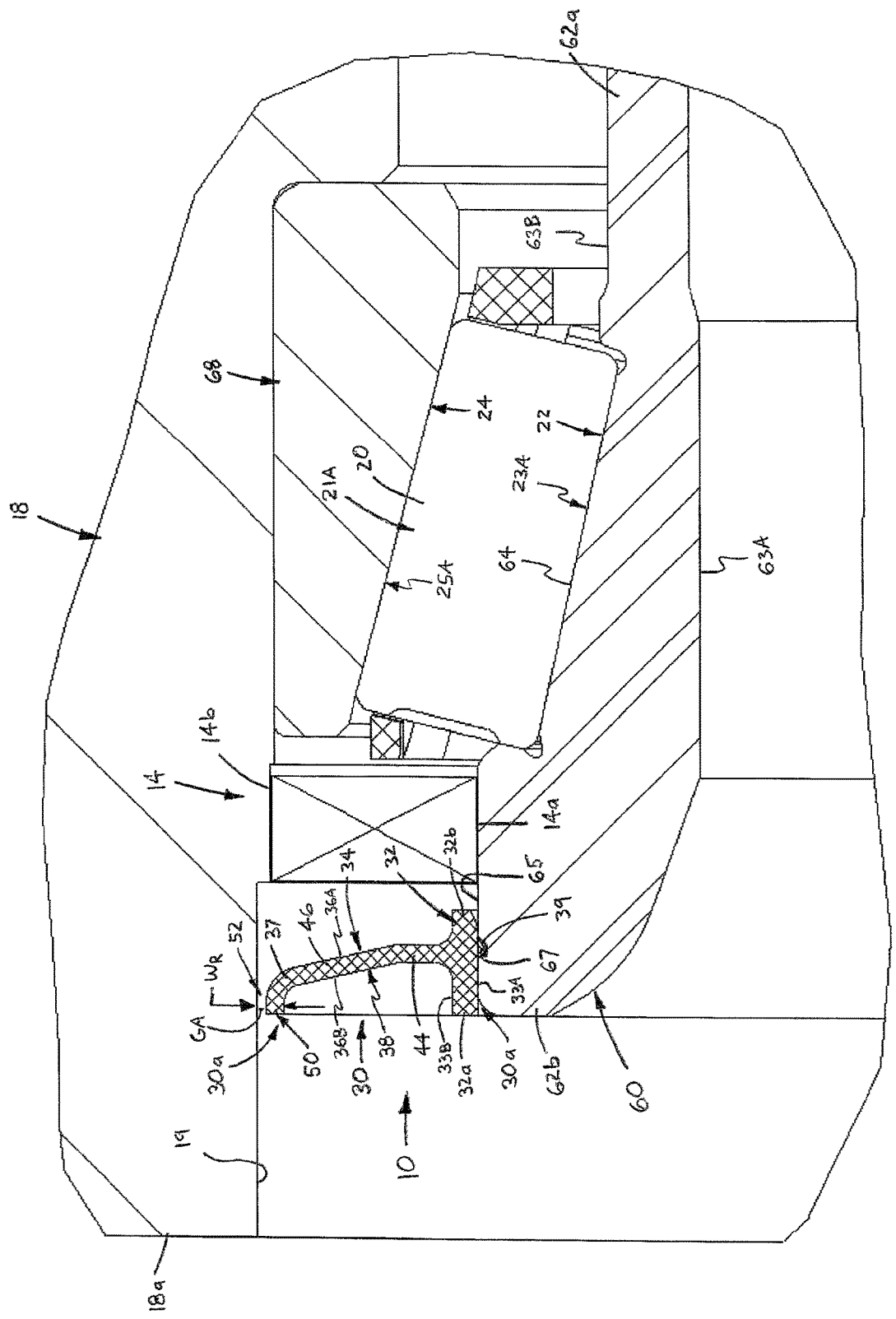
FIG. 4 is a more enlarged view of an outboard portion of FIG. 3.
Figure 5:
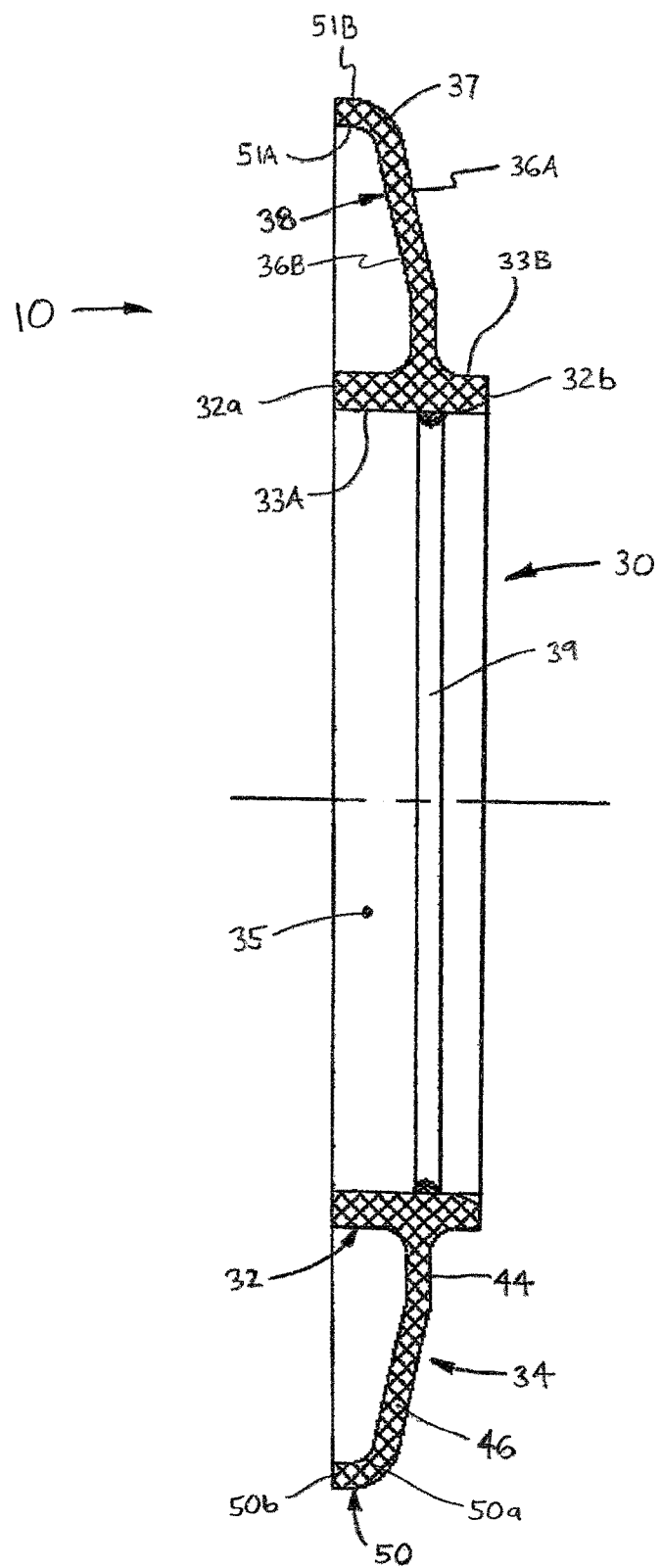
FIG. 5 is an enlarged, axial cross-sectional view of the first embodiment secondary seal.
Figure 6:
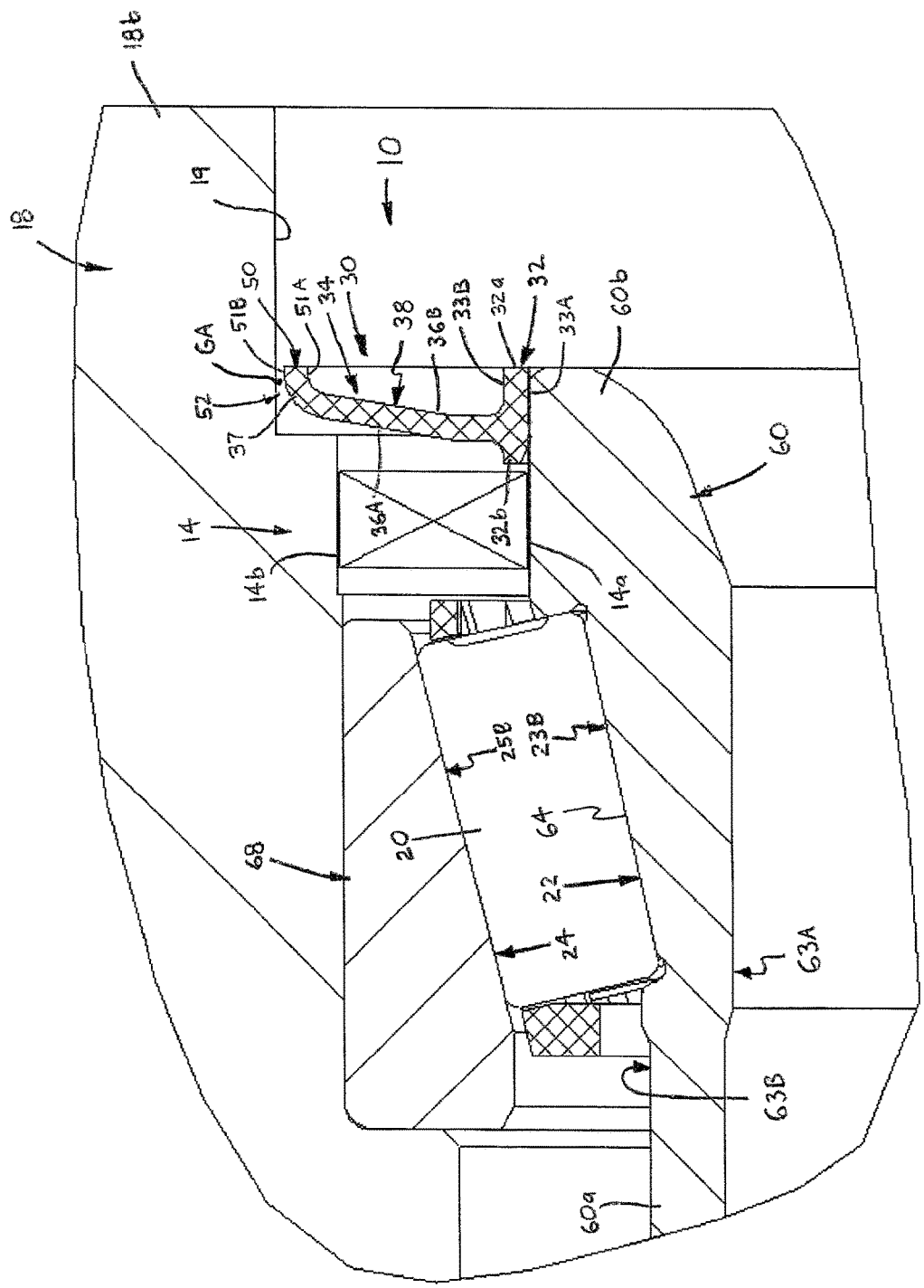
FIG. 6 is a more enlarged view of an inboard portion of FIG. 3.
Figure 8:
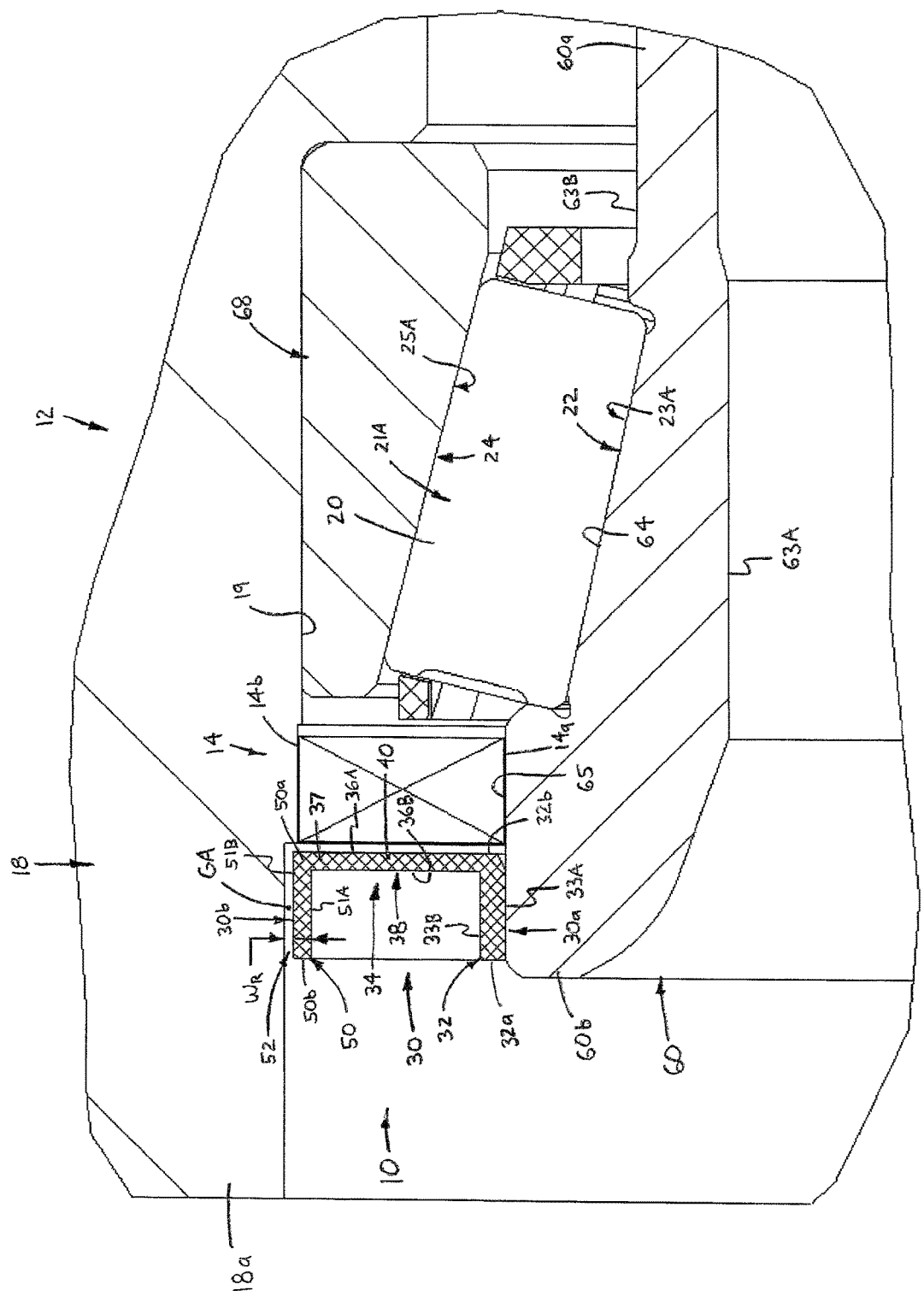
FIG. 8 is a more enlarged view of an outboard portion of FIG. 7, showing the second embodiment secondary seal.

The secondary seal 10 includes a rigid annular body 30 having an inner radial end 30a coupled with the inner axle 16 and an opposing outer radial end 30b. The outer radial end 30b of the annular body 30 is spaced radially inwardly from the inner circumferential surface 19 of the outer hub 18 so as to define an annular gap GA between the annular body 30 and the outer hub 18. Preferably, the annular gap GA has a relatively minimal radial width $w_R$, as indicated in FIGS. 4 and 8, most preferably having a value of between zero millimeters (0 mm) and one millimeter (1 mm), to inhibit contaminants from passing through the gap GA, but also preferably greater than zero such that the outer end 30b does not contact the outer hub 18 in order to reduce frictional force exerted on the hub 18 during rotation.

Also, the seal annular body 30 is located between the primary seal 14 and a proximal one of the outboard axial end 18a and the inboard axial end 18b of the outer hub 18 so as to provide a barrier configured to prevent contaminants passing into the interior space $S_I$ (i.e., through an end 18a or 18b of the hub 18) from contacting the primary seal 14. Thereby, the secondary seal 10 serves to both increase the sealing efficiency of the primary seal 14 and to extend or prolong the functional life of the seal 14 by preventing, or at least reducing the amount of, external contaminants such as dust, metal particles, oil, water, etc., which contact the seal 14.

Preferably, the rigid annular body 30 of the secondary seal 10 is integrally formed, i.e., of one-piece construction, but may alternatively be formed of a plurality of separate components formed as described in detail below and connected by any appropriate means. Also, the annular body 30 is preferably formed of a metallic material, such as for example, a stamped or sintered steel, or a rigid polymeric material, but may be formed of any other appropriate material.

Further, the rigid annular body 30 of the secondary seal 10 preferably includes an inner cylindrical portion 32 for coupling the body 30 with the inner axle 16 and a radial flange portion 34 providing the substantial portion of the seal barrier. Specifically, the inner cylindrical portion 32 is located at the radial inner end 30a of the annular body 30 and has opposing axial ends 32a, 32b and inner and outer circumferential surfaces 33A, 33B. The inner circumferential surface 33A of the cylindrical portion 32 defines a central bore 35 (FIG. 5) sized to receive a portion of the inner axle 16 or preferably a portion of a ring 60 disposed about the inner axle 16, as described in detail below.

Furthermore, the radial flange portion 34 extends radially outwardly from the outer surface 33B of the cylindrical portion 32 and has opposing inner and outer radial surfaces 36A, 36B, respectively, and an outer circumferential edge 37 at the outer radial end 30b of the annular body 30. The outer radial surface 36B of the flange portion 34 provides a barrier surface 38 for deflecting contaminants generally axially away from the primary seal 14.

Figure 10:
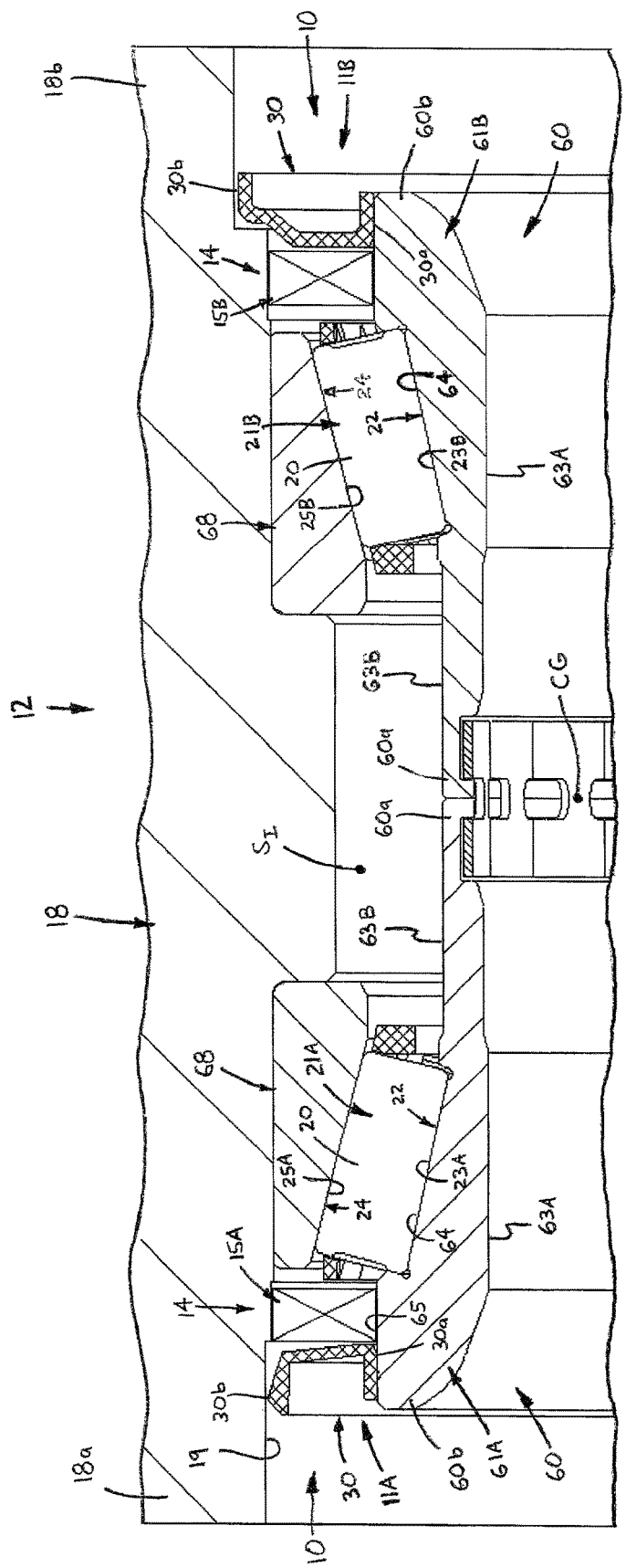
FIG. 10 is a broken-away, enlarged axial cross-sectional view of a double-row bearing assembly having two secondary seal devices in accordance with a fourth embodiment and the third embodiment.
Figure 11:
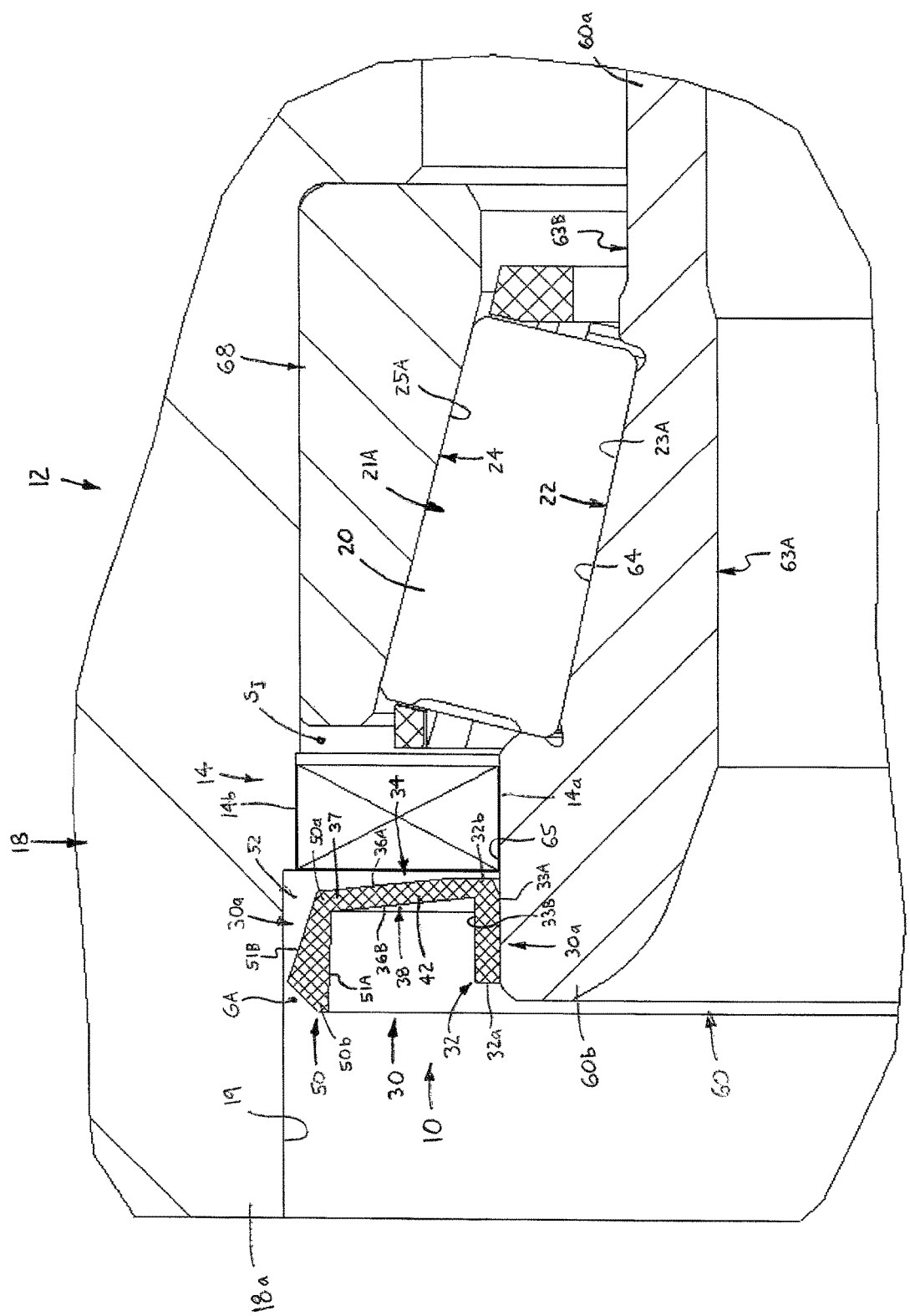
FIG. 11 is a more enlarged view of an outboard portion of FIG. 10, showing the fourth embodiment secondary seal.
Figure 12:
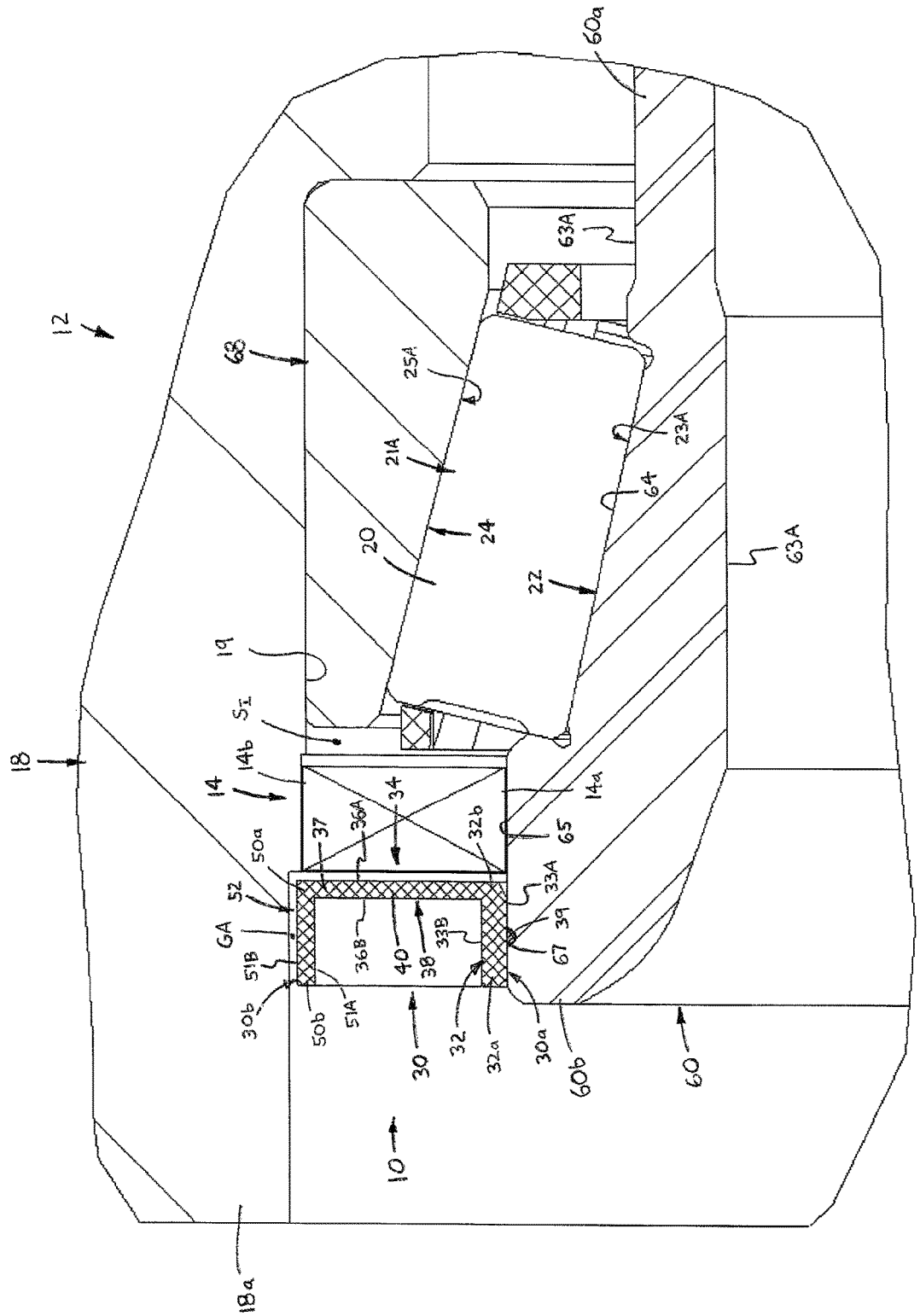
FIG. 12 is another view of the outboard portion of FIG. 7, showing a variation of the second embodiment seal with a mounting projection.
Figure 16:
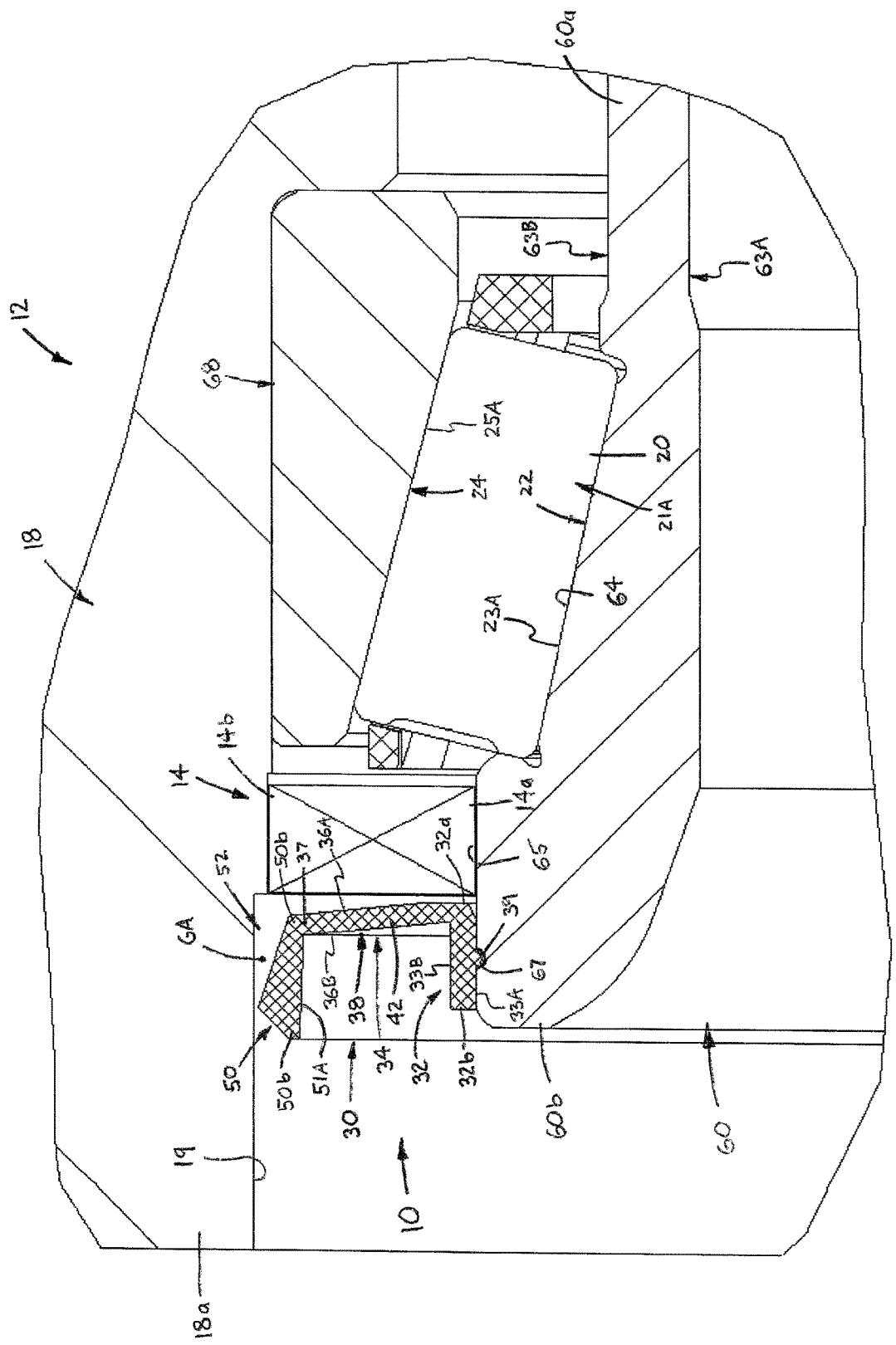
FIG. 16 is another view of the inboard portion of FIG. 10, showing a variation of the fourth embodiment seal with a mounting projection.
Figure 17:
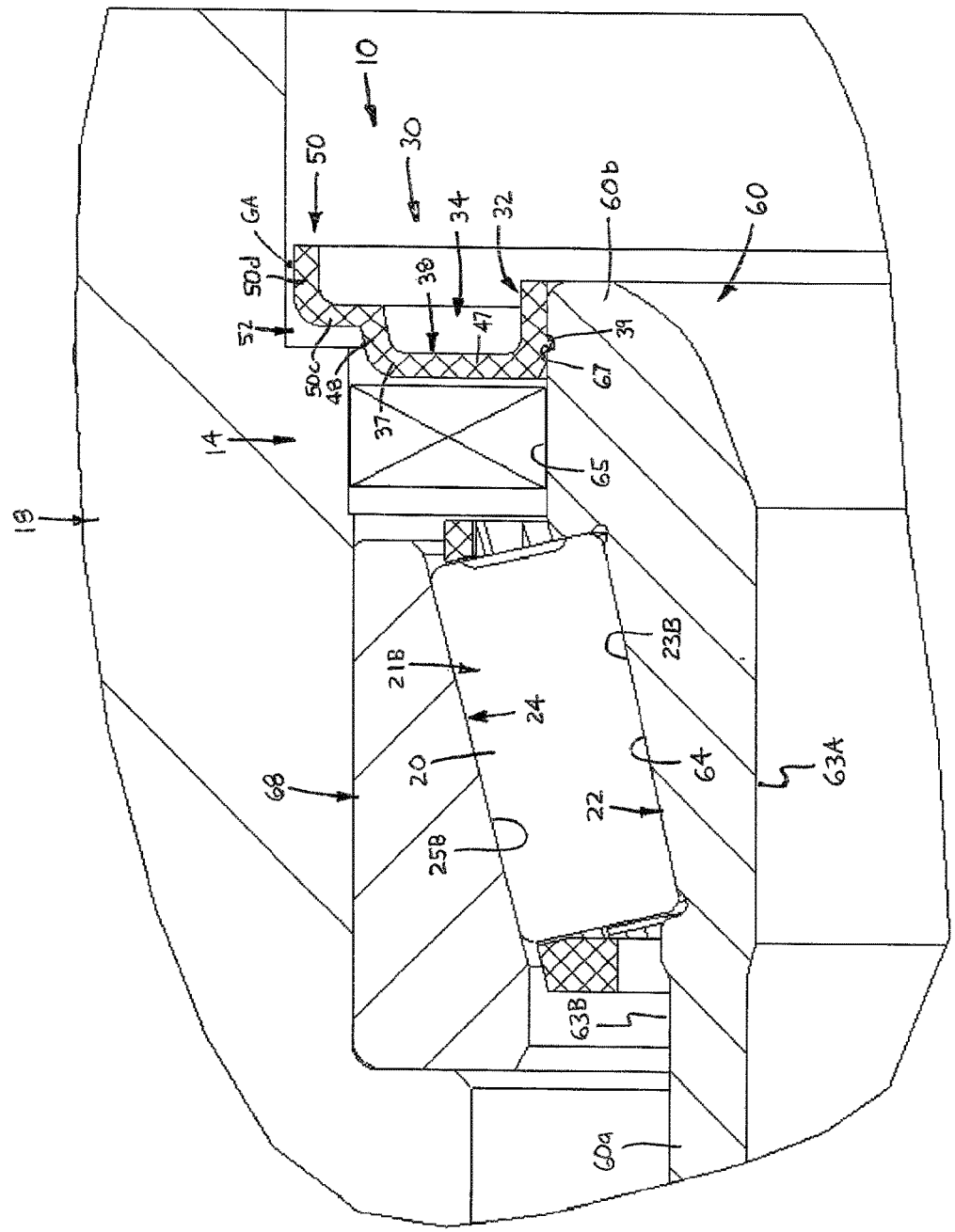
FIG. 17 is an enlarged, broken-away axial cross-sectional view of an outboard portion of a wheel bearing assembly showing a fifth embodiment of the secondary seal assembly.

In certain constructions as shown in FIGS. 10, 11 and 16, the flange portion 34 of the annular body 30 is formed as a frustoconical plate 42 extending both radially outwardly from the cylindrical portion 32 and axially toward the proximal axial end 18a or 18b of the outer hub 18. In other constructions depicted in FIGS. 7, 8 and 12-14, the radial flange portion 34 is formed as a circular annular plate 40 extending substantially radially outwardly from the cylindrical portion. As such, the flange portion 34 is at least generally perpendicular to the inner circumferential surface 19 of the outer hub 18, as well as perpendicular to the outer circumferential surface 17 of the inner axle 16.

In yet other constructions shown in FIGS. 3-6, 15 and 17, the flange portion 34 includes both an inner annular plate section 44 and an outer frustoconical section 46. The inner annular plate section 44 extends radially outwardly from the cylindrical portion 32 and the outer frustoconical plate section 46 extends radially outwardly from the annular plate section 44 and axially toward the proximal axial end 18a or 18b of the outer hub 18. Further, in one construction shown in FIG. 17, the radial flange portion 14 has an inner annular plate section 47 extending radially outwardly from the inner cylindrical portion 32 and an outer curved section 48 extending generally axially outwardly toward the proximal one of the axial ends 18a or 18b of the outer hub 18.

With the structure in which the entire flange portion 42 is frustoconical and the structure in which only the outer section 46 is frustoconical, at least a portion of the barrier surface 38 faces generally radially inwardly toward the central axis Ac. As a result, contaminants contacting the barrier surface 38 are directed both axially away from the primary seal 14 as well as radially inwardly away from the axial gap GA, to thereby reduce the potential for such contaminants to "migrate" through the annular gap GA and thereafter to the seal 14.

Referring now to FIGS. 3-17, the annular body 30 of the secondary seal 10 preferably further includes an outer cylindrical portion 50 extending axially from the outer circumferential edge 37 of the flange portion 34 and toward the proximal axial end 18a or 18b of the outer hub 18. The outer cylindrical portion 50 has an inner axial end 50a connected with the flange portion 34, an opposing outer axial end 50b, and inner and outer circumferential surfaces 51A, 51B, respectively. The outer surface 51B is spaced radially inwardly from the inner circumferential surface of 19 of the outer hub 18, such that the annular gap GA is defined between the outer cylindrical portion 50 and the outer hub 18. Thereby, the outer cylindrical portion 50 of the seal annular body 30 is configured to provide a labyrinth seal 52 with the outer hub 18. Further, the outer cylindrical portion 50 may have a generally constant radial thickness, as shown in FIGS. 4-6, 8, 12-15, 17 and 18 or may be generally tapered or wedge-shaped as depicted in FIGS. 11 and 16. Although forming the seal annular body 30 with the outer cylindrical portion 50 is presently preferred, the annular body 30 may be formed without any outer cylindrical portion and in which the only outer circumferential edge 37 of the radial portion 34 defines the annular gap GA with the outer hub 18 (alternative not shown).

Figure 13:
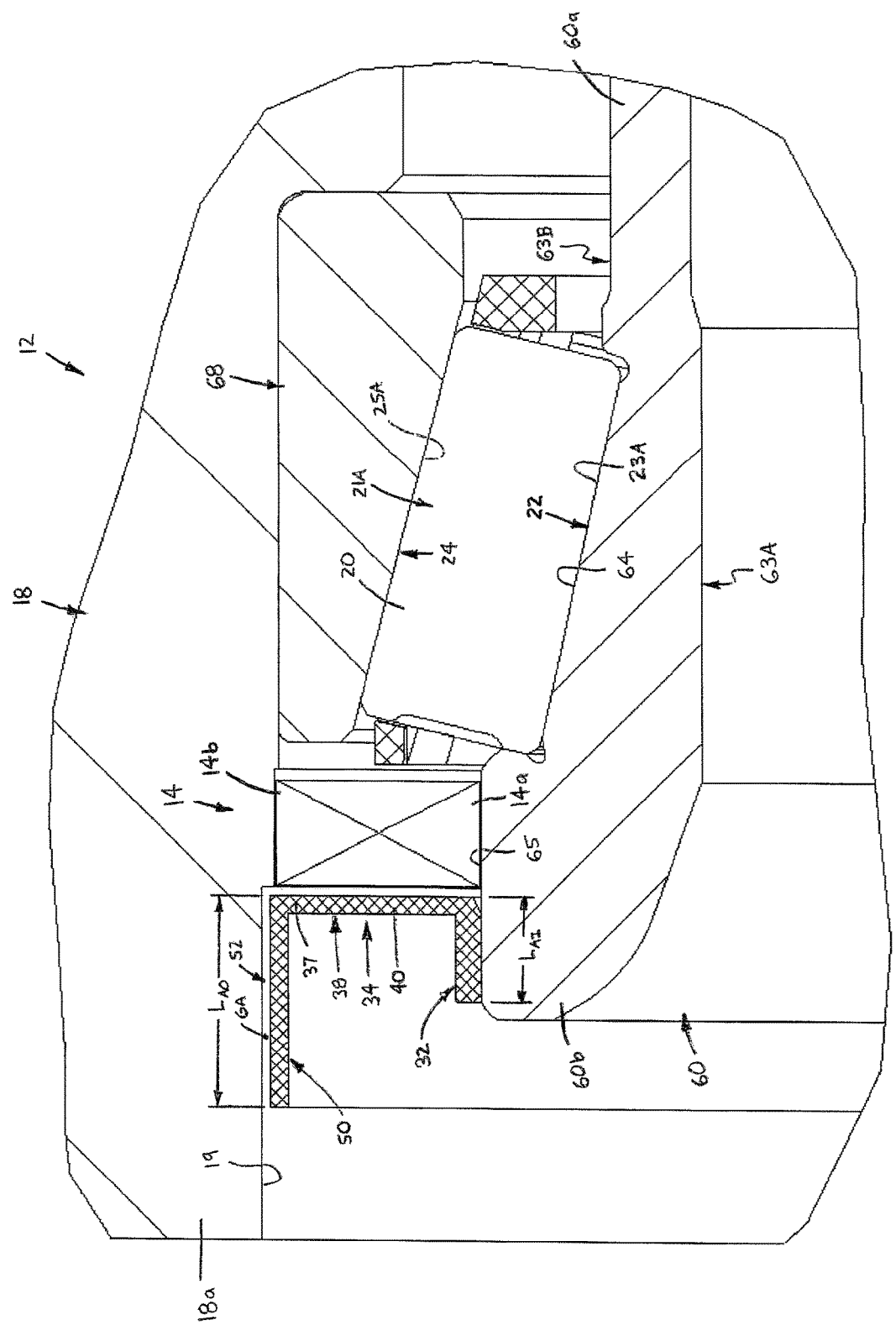
FIG. 13 is another view of the outboard portion of FIG. 7, showing a variation of the second embodiment seal with an extended outer cylindrical portion.
Figure 14:
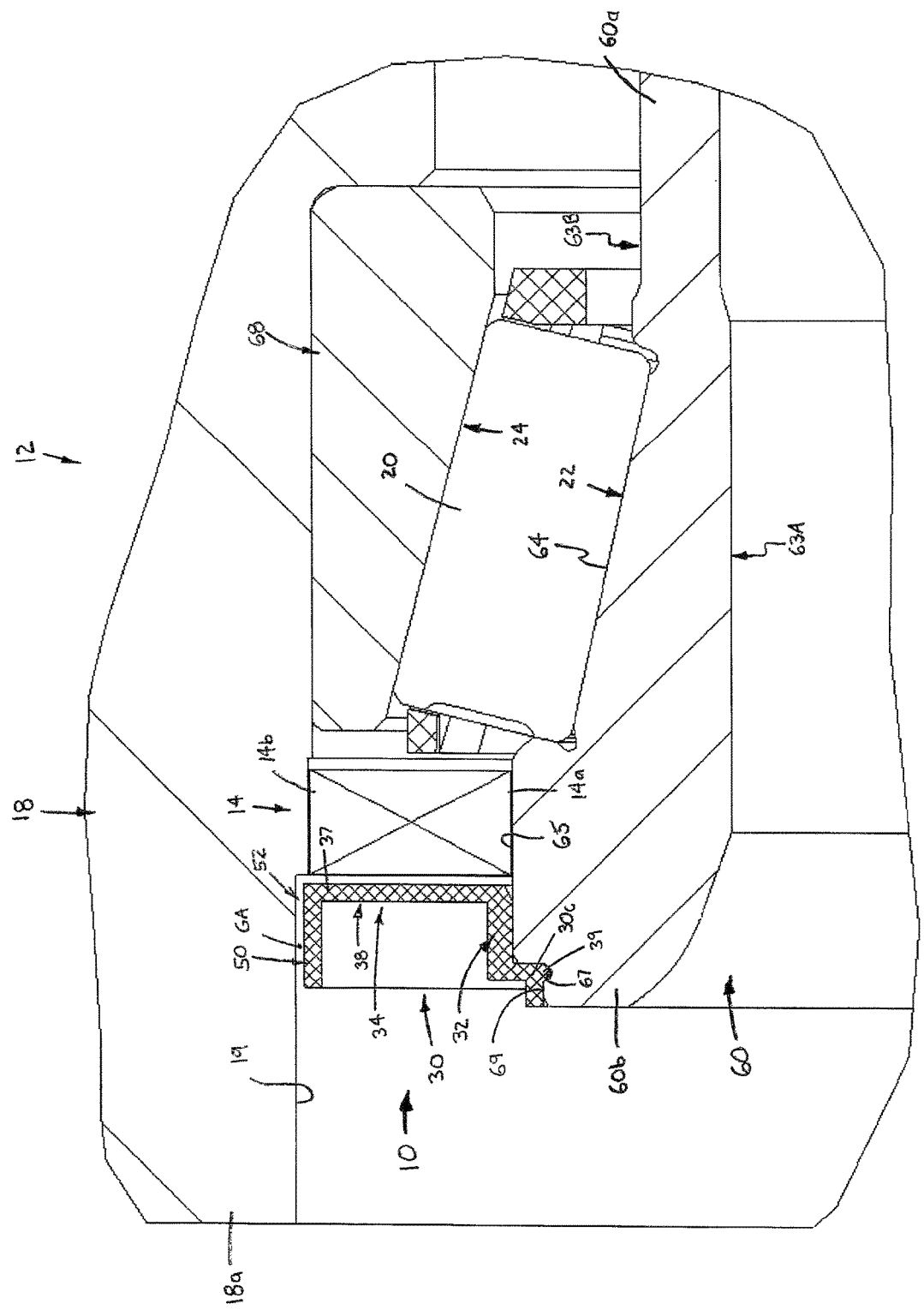
FIG. 14 is another view of the outboard portion of FIG. 7, showing a variation of the second embodiment seal with an inwardly-stepped mounting section engaged with a bearing inner ring.
Figure 15:
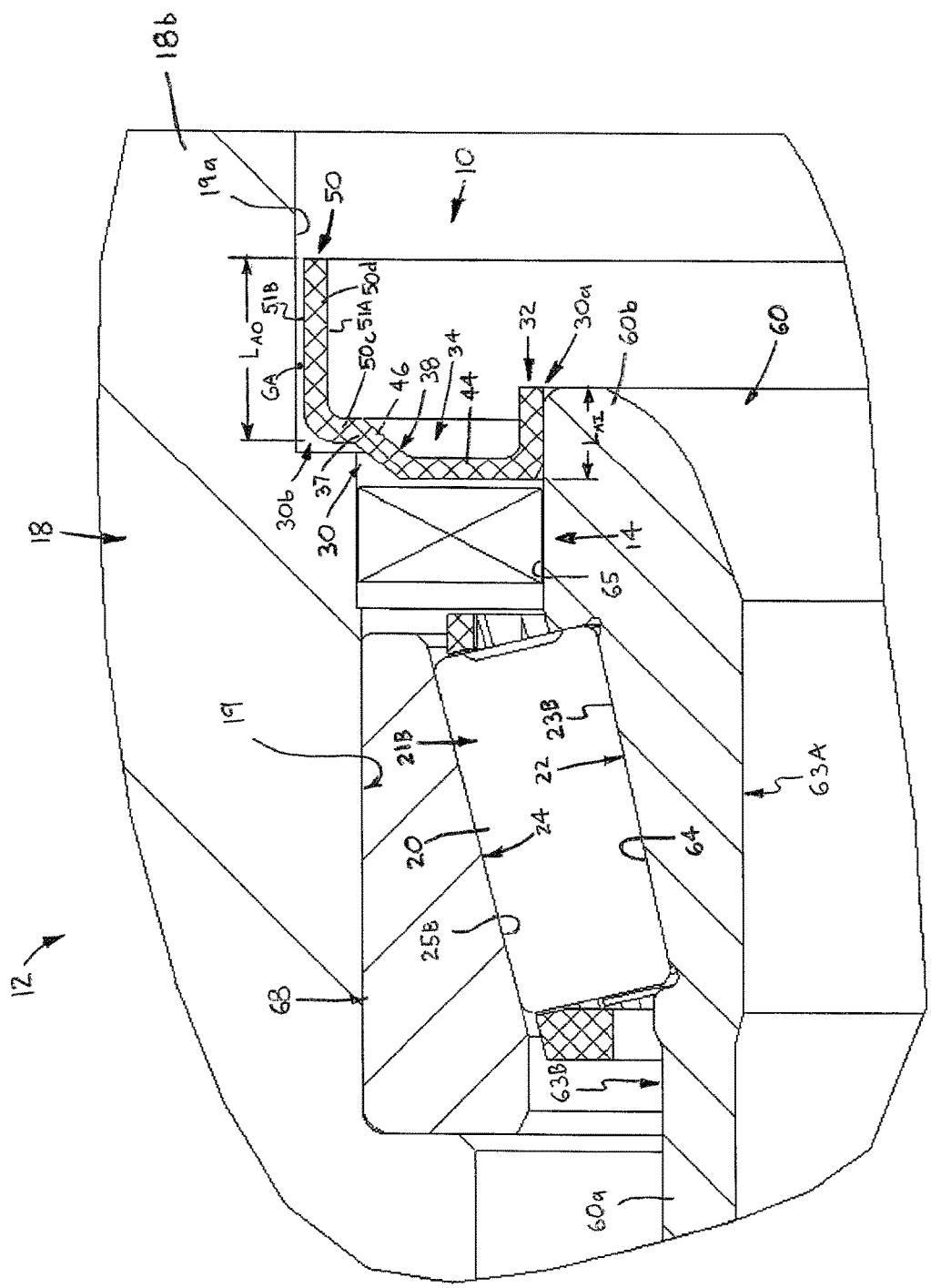
FIG. 15 is another view of the inboard portion of FIG. 7, showing a variation of the third embodiment seal with an extended outer cylindrical portion.

In certain embodiments as shown in FIGS. 13 and 15, the outer cylindrical portion 50 of the annular body 30 has an axial length LAO substantially greater than an axial length LAT of the inner cylindrical portion 32. As a result, the extent of the resulting labyrinth seal 52, and the sealing efficiency thereof, is substantially increased. However, the outer cylindrical portion 50 may have an axial length LAO about equal to (FIGS. 8, 9, 11, 12, 14 and 16) or lesser than (FIGS. 4-6 and 17) the axial length $L_{AI}$ of the inner cylindrical portion 32, particularly when axial space in the wheel bearing assembly 12 is limited.

Figure 9:
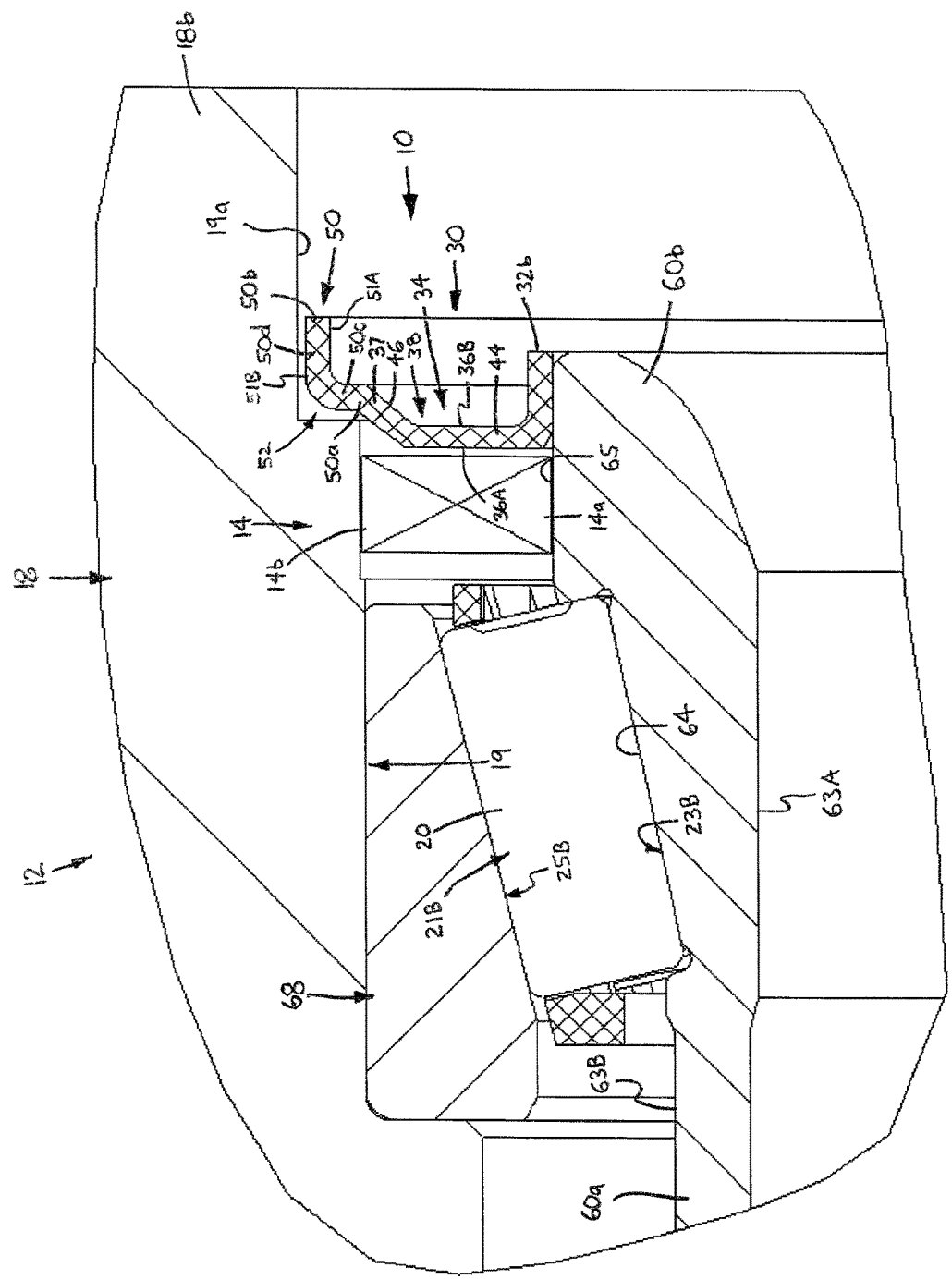
FIG. 9 is a more enlarged view of an inboard portion of FIG. 7, showing the third embodiment secondary seal.

Referring to FIGS. 9, 15 and 16, the inner circumferential surface 19 of the outer hub 18 may have a radially-outwardly stepped surface section 19a spaced axially outwardly from the region of the interior space $S_I$ within which the primary seal 14 is located. With this hub structure, the outer cylindrical portion 50 of the seal annular body 30 may be formed having a first section 50c connected with the flange portion 34 and a second, radially-outwardly stepped section 50d extending axially from the first section 50c and disposed within the outwardly-stepped surface section 19a of the outer hub 18. Thereby, the labyrinth seal 52 formed by the outer cylindrical portion 50 and the outer hub 18 defines a tortuous path which increases the sealing efficiency of the seal 52.

Referring now to FIGS. 6, 8, 9, 11, 13 and 15, the secondary seal 10 may be formed so as to be coupled with the inner axle 16 solely by a friction fit. More specifically, the inner circumferential surface 33A of the seal body cylindrical portion 32 may be sized diametrically sightly lesser than the outer surface 17 of the inner axle 16, or preferably of an outer shoulder surface 65 of the ring 60 disposed on the axle 16, as described below. As a result, the secondary seal 10 may be coupled with the inner axle 16 by interference between the cylindrical portion inner surface 33A with the one outer surface 17 or 65.

Referring to FIGS. 4, 5, 12, 16 and 17, the inner axle 16 or more preferably, the ring 60 disposed about the inner axle 16, may include an annular groove 67 extending radially inwardly from the outer shoulder surface 65 of the ring 60. Correspondingly, the inner cylindrical portion 32 of the seal body 30 may be formed having an annular bead or mounting projection 39 extending radially inwardly from the inner circumferential surface 33A. With this structure, the projection 39 is disposable within the annular groove 67 of the inner axle (not shown) or of the ring 60 so as to couple the annular body 30 with the inner axle 16.

As shown in FIGS. 14 and 19, the seal annular body 30 may be coupled with and positioned on the axle 16 directly, or preferably indirectly through the ring 60, by means of interlocking or inter-engaging stepped sections. Specifically, the inner axle 16 or the ring 60 disposed about the inner axle 16 has a radially-inwardly stepped shoulder section 69. In a complementary manner, the inner cylindrical portion 32 of the seal annular body 30 may include a radially-inwardly stepped section 30c disposable about the stepped shoulder section 69 of the inner axle 16, or the ring 60 mounted about the axle 16, so as to couple the seal annular body 30 with the inner axle 16. Preferably, the stepped section 30c of the seal body cylindrical portion 32 also includes an annular mounting projection/rib 39 disposable within a corresponding annular groove 67 in the stepped shoulder section 69.

Figure 2:
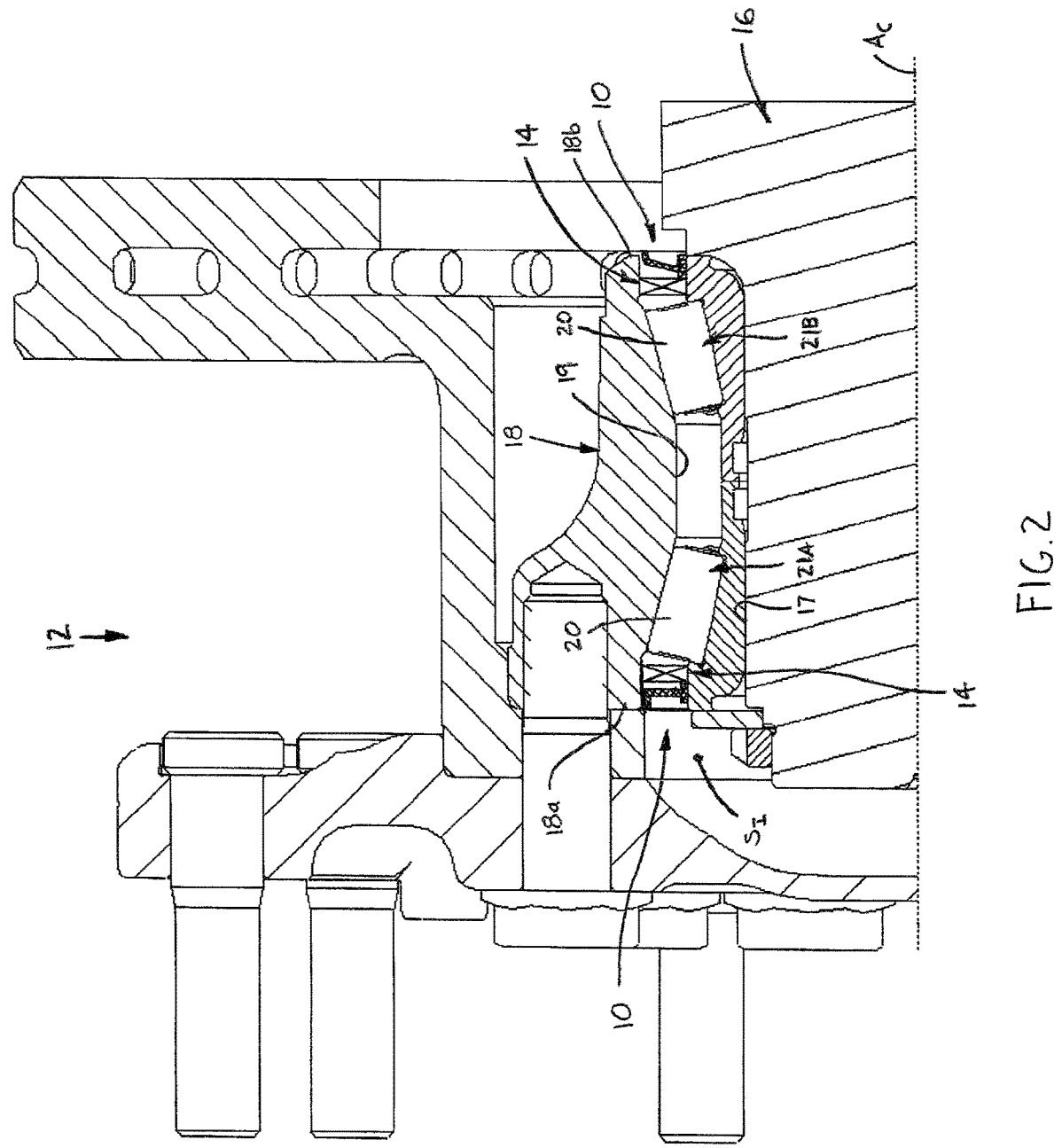
FIG. 2 is an axial cross-sectional view of an upper portion of another wheel bearing assembly having two sealing devices in accordance with the present invention, shown with a solid inner axle.
Figure 3:
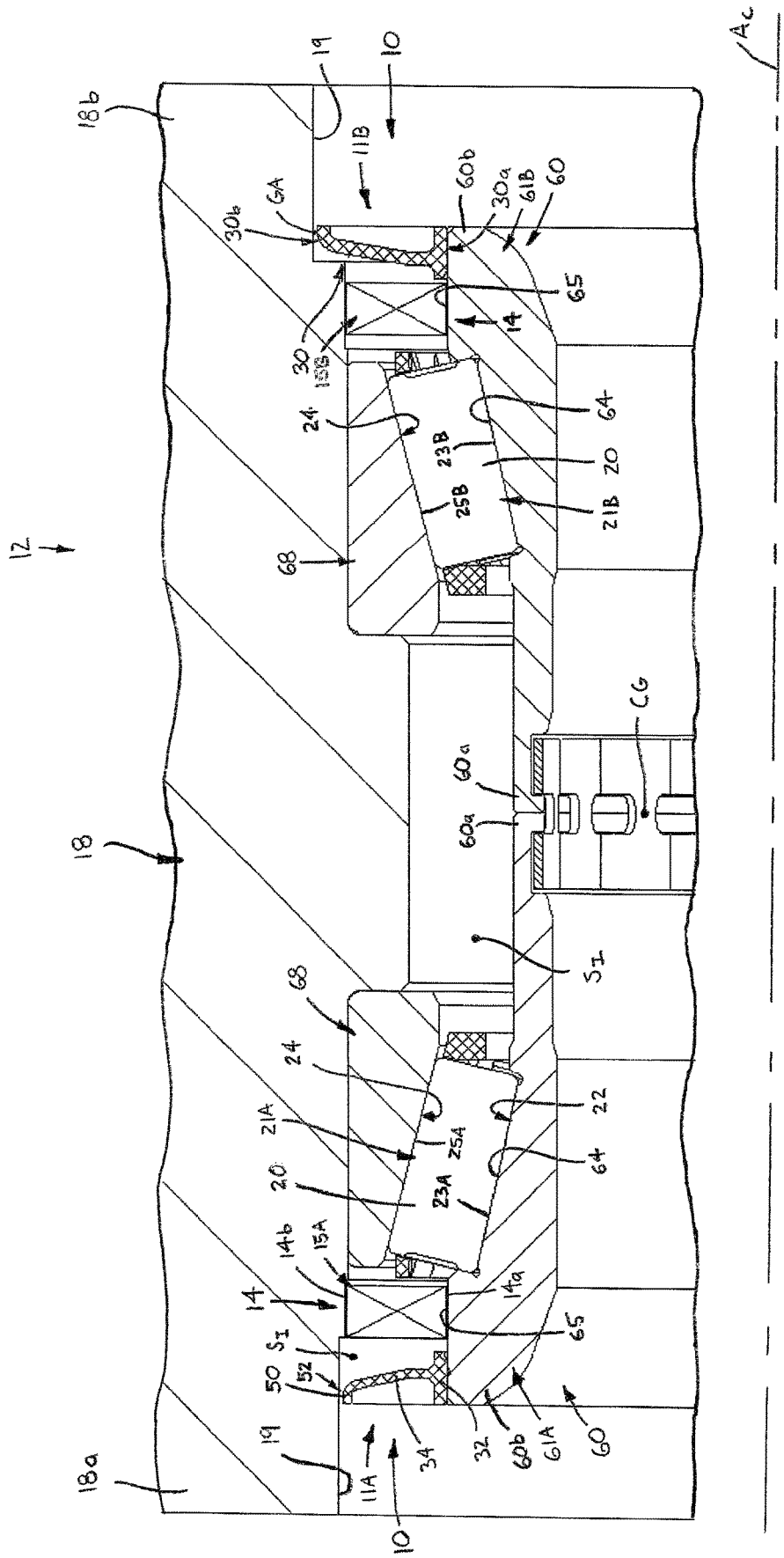
FIG. 3 is a broken-away, enlarged axial cross-sectional view of a double-row bearing assembly having two secondary seal devices in accordance with a first embodiment, showing one version with a mounting projection and one version without any projection.
Figure 7:
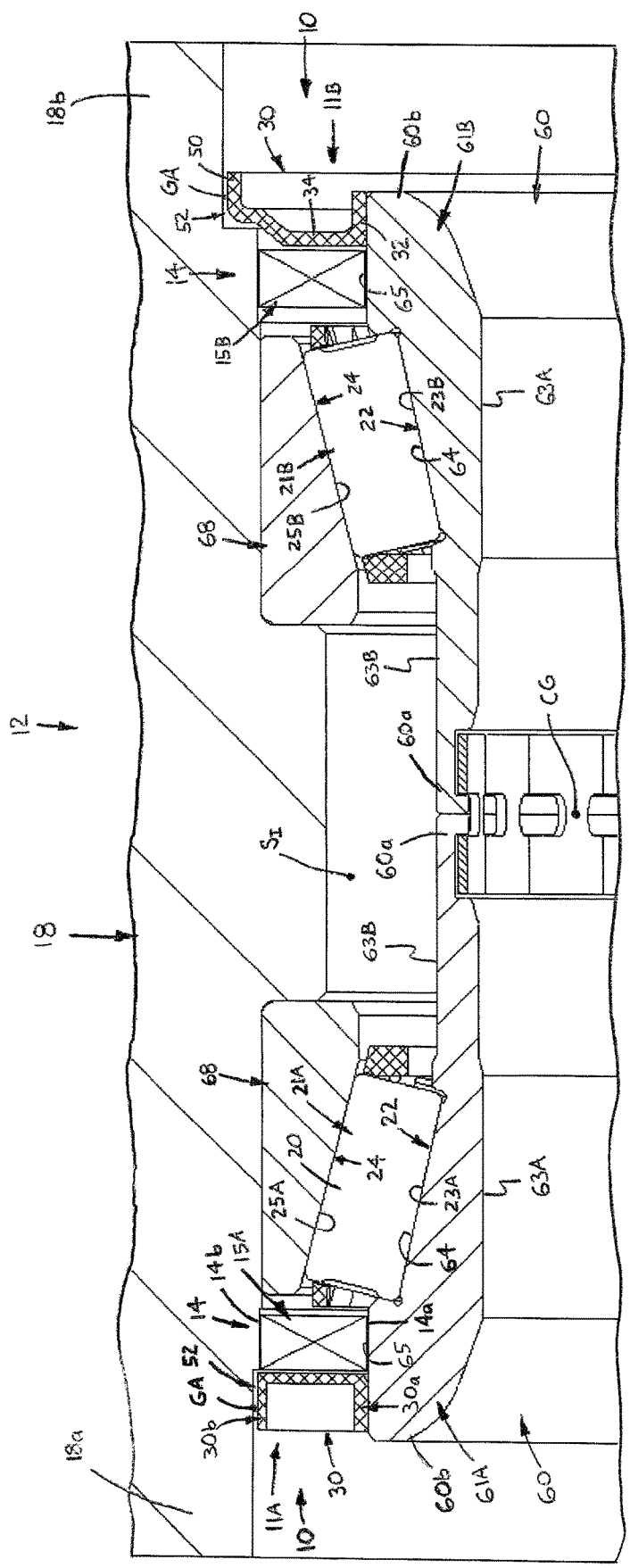
FIG. 7 is a broken-away, enlarged axial cross-sectional view of a double-row bearing assembly having two secondary seal devices in accordance with a second embodiment and a third embodiment.

Referring to FIGS. 3-17, the at least one bearing inner race 22 is preferably provided by an annular ring 60 disposed about the outer circumferential surface 17 of the inner axial 16, as shown in FIGS. 1 and 2. Specifically, the annular ring 60 has an inner axial end 60a and an opposing outer axial end 60b, the orientation of "inner" and "outer" being determined by relative proximity to a geometric center CG of the bearing assembly 10 as indicated in FIGS. 3, 7 and 10. The ring 60 also has an inner circumferential surface 63A and an opposing outer circumferential surface 63B providing a raceway surface 64 adjacent to the inner axial end 60a and an outer circumferential shoulder surface 65 between the raceway surface 64 and the outer axial end 60b. With such an inner ring 60, the at least one primary seal 14 is coupled with shoulder surface 65 of the ring 60 adjacent to the raceway surface 65 and the annular body 30 of the secondary seal 10 is coupled with the shoulder surface 65 at a position between the outer axial end 60b and the primary seal 14.

Figure 18:
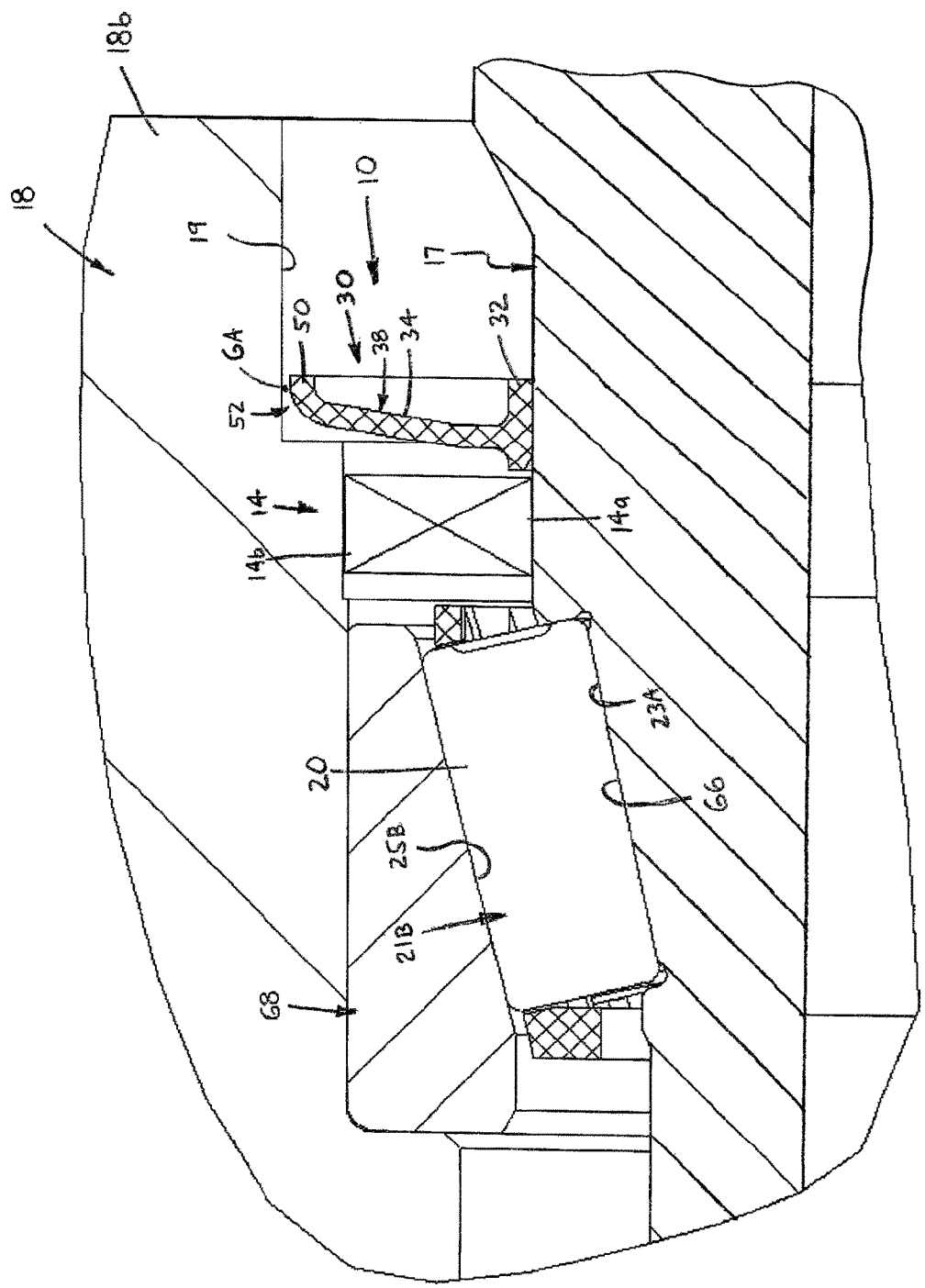
FIG. 18 is an enlarged, broken-away axial cross-sectional view of an outboard portion of a wheel bearing assembly with the first embodiment seal, showing an inner raceway provided directly on the inner axle.

Referring particularly to FIG. 18, the at least one inner race 22 may alternatively be provided directly on the inner axle 16, specifically by an annular groove 66 extending radially inwardly from the outer circumferential surface 17 of the axle 16. As such, the at least one primary seal 14 is coupled with the axle outer surface 17 adjacent to the groove 66 and the secondary seal annular body 30 is also coupled with the outer surface 17 at a location spaced axially outwardly from the both the groove 66 and the primary seal 14.

Referring now to FIGS. 3, 7 and 10, the wheel bearing assembly 12 is preferably a "double row" bearing assembly which includes first and second rows 21A, 21B of rolling elements 20. As such, the at least one inner race 22 on the inner axle 16 includes first and second inner races 23A, 23B spaced axially apart and each preferably provided by a separate annular ring 60 as described above. That is, the annular ring 60 is a first annular ring 61A and the wheel bearing assembly 12 further includes a second annular ring 61B disposed about the outer circumferential surface 17 of the inner axle 16.

The second annular ring 61B is preferably substantially identically formed as the first annular ring 61A, specifically as described above, but arranged or oriented so as to be mirrored about the geometric center CG of the bearing assembly 12, and is preferably disposed axially between the first annular ring 61A and the inboard axial end 18b of the outer hub 18. Also, the second annular ring 61B has an inner axial end 60a adjacent to the inner end 60a of the first annular ring 16B, an outer axial end 60b, an outer circumferential raceway surface 64 adjacent to the inner axial end 60a, and an outer circumferential shoulder surface 65 disposed between the raceway surface 64 and the outer axial end 60b.

Further, the at least one outer race 24 preferably includes a first outer race 25A disposed about the first inner race 23A and the outer hub 18 preferably further includes a second outer race 25B disposed about the second inner race 23B. Each outer race 25A, 25B is preferably provided by a separate one of two annular rings 68 sized diametrically larger than and disposed about the two inner rings 60, the two rings 68 being spaced axially apart and coupled with the inner surface 19 of the outer hub 18. As mentioned above, the plurality of rolling elements is a first row 21A or plurality of rolling elements 20 and a second row/plurality 21B of rolling elements 20 is disposed between the second inner race 23B and the second outer race 25B.

Furthermore, the at least one primary seal 14 is a first primary seal 15A located adjacent to raceway surface 64 of the first inner ring 61A and a second primary seal 15B is disposed about the shoulder surface 65 of the second annular ring 61B adjacent to a second inner raceway surface 64. With this structure, the wheel bearing assembly 12 preferably includes two secondary seals 10, preferably a first secondary seal 11A adjacent to the first primary seal 15A and a second secondary seal 11B adjacent to the second primary seal 15B.

Specifically, the second secondary seal 11B includes a rigid annular body 30 formed as described above; that is, the rigid body 30 has an inner radial end 30a coupled with the shoulder surface 65 of the second inner ring 61B and an outer radial end 30b. The outer radial end 30b of the second seal body 30 is spaced radially inwardly from the inner circumferential surface 19 of the outer hub 18 so as to define an annular gap GA between the seal annular body 30 and the outer hub 18. The annular body 30 of the second secondary seal 11B is located between the second primary seal 15B and the inboard axial end 18b of outer hub 18 so as to provide a barrier configured to prevent contaminants passing into the interior space $S_I$ through the inboard end 18b from contacting the second primary seal 15B.

With the two preferred secondary seals 11A, 11B each provided to protect a separate one of two primary seals 15A, 15B, each secondary seal 11A, 11B may be formed identical to each other and in any of one of the various constructions described above and shown in the drawing figures. However, the two seals 11A, 11B may be formed differently from each other or/and in another appropriate structure as broadly disclosed herein. Also, the wheel bearing assembly 10 may include only a single secondary seal 10 located adjacent to either primary seal 15A or 15B and between that one seal 15A, 15B and the proximal axial end 18a, 18b, respectively, of the outer hub 18. Furthermore, the secondary seal 10 may be used with a bearing assembly 12 including only a single row 21 of rolling elements 20 or three or more rows 21 of rolling elements 20 (neither alternative shown).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:
1. A wheel bearing assembly comprising:
a fixed inner axle having an outer circumferential surface and at least one bearing inner race;
an outer hub rotatably disposed about the inner axle and having an outboard axial end, an inboard axial end, an inner circumferential surface spaced radially outwardly from the outer circumferential surface of the inner axle so as to define an interior space, and at least one bearing outer race disposed about the at least one inner race;
a plurality of rolling elements disposed between the at least one inner race and the at least one outer race;
at least one primary seal having an inner radial end connected with the inner axle adjacent to the at least one inner race and an outer radial end sealingly engaged with the outer hub adjacent to the at least one outer race; and
a secondary seal including a rigid annular body having an inner radial end coupled with the inner axle and an outer radial end spaced radially inwardly from the inner circumferential surface of the outer hub so as to define an annular gap between the annular body and the outer hub, the annular body being located between the primary seal and a proximal one of the outboard axial end and the inboard axial end of the outer hub so as to provide a barrier configured to prevent contaminants passing into the interior space from contacting the primary seal;

wherein the annular body of the secondary seal includes an inner cylindrical portion at the radial inner end of the annular body, the cylindrical portion having a bore sized to receive a portion of the inner axle or a portion of a ring disposed about the inner axle, a radial flange portion extending radially outwardly from the cylindrical portion and having an outer circumferential edge, and an outer cylindrical portion extending axially from the outer circumferential edge of the flange portion and toward the proximal axial end of the outer hub, the outer cylindrical portion being spaced inwardly from and located adjacent to the outer hub so as to provide a labyrinth seal with the outer hub and having an axial length greater than an axial length of the inner cylindrical portion.

2. The wheel bearing assembly as recited in claim 1 wherein the radial flange portion of the secondary seal annular body is formed as one of:
- a frustoconical plate extending both radially outwardly from the cylindrical portion and axially toward the proximal axial end of the outer hub;
- an annular plate extending substantially radially outwardly from the cylindrical portion; and
- an inner annular plate section extending radially outwardly from the cylindrical portion and an outer frustoconical plate section extending radially outwardly from the circular plate section and axially toward the proximal axial end of the outer hub.

3. The wheel bearing assembly as recited in claim 1 wherein the inner circumferential surface of the outer hub has a radially-outwardly stepped surface section and the outer cylindrical portion of the seal annular body has a first section connected with the radial flange and a second, radially-outwardly stepped section extending axially from the first section and disposed within the outwardly-stepped surface section of the outer hub.

4. The wheel bearing assembly as recited in claim 1 wherein at least one of:
- the inner cylindrical portion of the seal annular body has an inner circumferential surface frictionally engaged with the outer circumferential surface of the inner axle or of a ring disposed about the inner axle so as to couple the seal annular body with the inner axle; and
- the inner axle or a ring disposed about the inner axle has an annular groove and the inner cylindrical portion of the seal annular body has an inner circumferential surface and an annular projection extending radially inwardly from the inner circumferential surface, the projection being disposeable within the annular groove of the inner axle or the ring disposed about the axle so as to couple the annular body with the inner axle.

5. The wheel bearing assembly as recited in claim 1 wherein:
- the inner axle or a ring disposed about the inner axle has a radially-inwardly stepped shoulder section; and
- the inner cylindrical portion of the seal annular body includes a radially-inwardly stepped section disposable about the stepped shoulder section of the inner axle or the ring disposed about the axle so as to couple the seal annular body with the inner axle.

6. The wheel bearing assembly as recited in claim 1 wherein the annular body of the secondary seal is of one-piece construction.

7. The wheel bearing assembly as recited in claim 1 wherein the annular body of the secondary seal is formed of a metallic material or a rigid polymeric material.

8. The wheel bearing assembly as recited in claim 1 wherein the annular gap has a radial width with a value of between zero millimeters (0 mm) and one millimeter (1 mm).

9. The wheel bearing assembly as recited in claim 1 wherein:
- the bearing inner race is provided by an annular ring disposed about the outer circumferential surface of the inner axle, the annular ring having an inner axial end, an outer axial end, an outer circumferential raceway surface adjacent to the inner axial end and an outer circumferential shoulder surface between the raceway surface and the outer axial end;
- the at least one primary seal is coupled with shoulder surface of the inner ring adjacent to the raceway surface; and
- the annular body of the secondary seal is coupled with the shoulder surface between the outer axial end and the primary seal.

10. The wheel bearing assembly as recited in claim 9 wherein:
- the annular ring is a first annular ring and a second annular ring is disposed about the outer circumferential surface of the inner axle so as to be disposed axially between the first annular ring and the inboard axial end of the outer hub, the second annular ring having an inner axial end adjacent to the inner end of the first annular ring, an outer axial end, an outer circumferential raceway surface adjacent to the inner axial end and an outer circumferential shoulder surface between the raceway surface and the outer axial end;
- the outer race is a first outer race disposed about the first inner race and the outer hub has a second outer race disposed about the second inner race;
- the plurality of rolling elements is a first plurality of rolling elements and a second plurality of rolling elements is disposed between the second inner race and the second outer race;
- the at least one primary seal is a first primary seal and a second primary seal is disposed about the shoulder surface of the second annular ring adjacent to the second inner raceway surface; and
- the secondary seal is a first secondary seal and a second secondary seal includes a rigid annular body having an inner radial end coupled with the shoulder surface of the second inner ring and an outer radial end spaced radially inwardly from the inner circumferential surface of the outer hub so as to define an annular gap between the seal annular body and the outer hub, the annular body being located between the second primary seal and the inboard axial end of outer hub so as to provide a barrier configured to prevent contaminants passing into the interior space from contacting the second primary seal.

11. A wheel bearing assembly comprising:
- a fixed inner axle having an outer circumferential surface and at least one bearing inner race;
- an outer hub rotatably disposed about the inner axle and having an outboard axial end, an inboard axial end, an inner circumferential surface spaced radially outwardly from the outer circumferential surface of the inner axle so as to define an interior space, and at least one bearing outer race disposed about the at least one inner race;

a plurality of rolling elements disposed between the at least one inner race and the at least one outer race;

at least one primary seal having an inner radial end connected with the inner axle adjacent to the at least one inner race and an outer radial end sealingly engaged with the outer hub adjacent to the at least one outer race; and a secondary seal including a rigid annular body having an inner radial end coupled with the inner axle and an outer radial end spaced radially inwardly from the inner circumferential surface of the outer hub so as to define an annular gap between the annular body and the outer hub, the annular body being located between the primary seal and a proximal one of the outboard axial end and the inboard axial end of the outer hub so as to provide a barrier configured to prevent contaminants passing into the interior space from contacting the primary seal;

wherein the annular body of the secondary seal includes an inner cylindrical portion at the radial inner end of the annular body, the cylindrical portion having a bore sized to receive a portion of the inner axle or a portion of a ring disposed about the inner axle and a radial flange portion extending radially outwardly from the cylindrical portion and having an outer circumferential edge at the outer radial end of the annular body, and outer cylindrical portion extending axially from the outer circumferential edge of the flange portion and toward the proximal axial end of the outer hub, the outer cylindrical portion being spaced inwardly from and located adjacent to the outer hub so as to provide a labyrinth seal with the outer hub and being formed having wedge-shaped axial cross-sections.

\* \* \* \* \*